US012573136B2

(12) United States Patent
Addey et al.

(10) Patent No.: US 12,573,136 B2
(45) Date of Patent: Mar. 10, 2026

(54) SCENE TRACKS FOR REPRESENTING MEDIA ASSETS

(71) Applicant: Apple Inc., Cupertino, CA (US)

(72) Inventors: David J Addey, Santa Cruz, CA (US); Alessandro Angeli, Sunnyvale, CA (US); Shalini Sahoo, San Jose, CA (US); Christopher L Flick, San Jose, CA (US); John Samuel Bushell, Santa Clara, CA (US); Yi Zhou, Sunnyvale, CA (US); Courtland M Idstrom, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 265 days.

(21) Appl. No.: 18/356,967

(22) Filed: Jul. 21, 2023

(65) Prior Publication Data

US 2024/0029351 A1 Jan. 25, 2024

Related U.S. Application Data

(60) Provisional application No. 63/391,101, filed on Jul. 21, 2022.

(51) Int. Cl.
| | |
|---|---|
| *G06T 17/00* | (2006.01) |
| *G06T 19/00* | (2011.01) |
| *G06T 19/20* | (2011.01) |

(52) U.S. Cl.
CPC ............ *G06T 17/00* (2013.01); *G06T 19/006* (2013.01); *G06T 19/20* (2013.01); *G06T 2210/61* (2013.01)

(58) Field of Classification Search
CPC ... G06T 17/00; G06T 19/006; G06T 2210/61; H04N 21/44012
See application file for complete search history.

(56) References Cited

U.S. PATENT DOCUMENTS

| | | | | |
|---|---|---|---|---|
| 8,078,655 B2 * | 12/2011 | Grubov | ............... | G06F 11/1451 |
| | | | | 707/999.203 |
| 8,363,051 B2 * | 1/2013 | Deffeyes | ................. | G06T 19/00 |
| | | | | 345/419 |
| 10,924,521 B2 * | 2/2021 | Shamma | ............ | H04N 21/4147 |
| 2010/0241670 A1 * | 9/2010 | Justice | ................ | G06F 16/2465 |
| | | | | 707/E17.005 |
| 2011/0289098 A1 * | 11/2011 | Oztaskent | ............. | G06F 16/955 |
| | | | | 707/769 |

(Continued)

FOREIGN PATENT DOCUMENTS

WO 2022/055650 A1 3/2022

OTHER PUBLICATIONS

Bar-Noy et al., Comparison of stream merging algorithms for media-on-demand, 2004 (Year: 2004).*

(Continued)

*Primary Examiner* — Phong X Nguyen
(74) *Attorney, Agent, or Firm* — BakerHostetler

(57) ABSTRACT

Improved media processing techniques includes media data formats with a "convenience" sample having both a snapshot and a delta description of a scene at the same media time. In other examples, improved media processing techniques include creating a temporary media sample having a merged snapshot or a merged delta in a context of a pre-render thread to improve performance of rendering performed in a context of a separate rendering thread.

20 Claims, 5 Drawing Sheets

(56) References Cited

U.S. PATENT DOCUMENTS

| | | | |
|---|---|---|---|
| 2011/0307545 A1* | 12/2011 | Bouazizi | H04N 21/23439 |
| | | | 709/203 |
| 2012/0075296 A1* | 3/2012 | Wegbreit | G06T 17/00 |
| | | | 345/419 |
| 2014/0279900 A1* | 9/2014 | Gupta | G06F 16/219 |
| | | | 707/634 |
| 2014/0280233 A1* | 9/2014 | Wang | G06F 16/634 |
| | | | 707/749 |
| 2019/0052937 A1* | 2/2019 | Malamal Vadakital | |
| | | | H04L 65/70 |
| 2021/0327145 A1* | 10/2021 | Noorkami | G11B 27/031 |
| 2021/0383297 A1* | 12/2021 | Ognev | G06Q 10/10 |
| 2022/0335694 A1* | 10/2022 | Bouazizi | G06F 3/011 |
| 2023/0298364 A1* | 9/2023 | Berman | G06T 3/18 |
| | | | 345/419 |
| 2024/0029351 A1* | 1/2024 | Addey | H04N 21/23412 |

OTHER PUBLICATIONS

Rainer et al., Merge and Forward: A Self-Organized Inter-Destination Media Synchronization Scheme for Adaptive Media Streaming over HTTP, 2018 (Year: 2018).*

* cited by examiner

100

500

SEEK TO DESIRED TIME
502

FIRST SAMPLE AT DESIRED TIME INCLUDES SNAPSHOT OR DELTA? 504

SNAPSHOT

RENDER SNAPSHOT FROM FIRST SAMPLE
506

DELTA

CREATE TEMPORARY SNAPSHOT    508

FIRST SAMPLE DELTA REFER TO SNAPSHOT OR DELTA? 510

SNAPSHOT

MERGE FIRST SAMPLE DELTA WITH REFERENCED SNAPSHOT 514

DELTA

MERGE FIRST SAMPLE DELTA WITH REFERENCED DELTA 512

RENDER TEMPORARY SNAPSHOT
516

FIG. 6
600

SCENE TRACKS FOR REPRESENTING MEDIA ASSETS

This application claims the benefit of U.S. Provisional Application No. 63/391,101, filed Jul. 21, 2022, and titled "Scene Tracks For Representing Media Assets," and this provisional application is incorporated herein by reference.

BACKGROUND

The present disclosure is directed to coding of media, and, in particular, coding of three-dimensional scenes.

File formats for time-based media typically include a serialized list of entries, where each entry, sometimes referred to as a media "sample," may describe a media item over a period time. The entries for the media item may be organized into tracks in the file format.

BRIEF DESCRIPTION OF THE DRAWINGS

FIG. 6 illustrates a computing device according to an aspect of the present disclosure.

DETAILED DESCRIPTION

Figure 1:
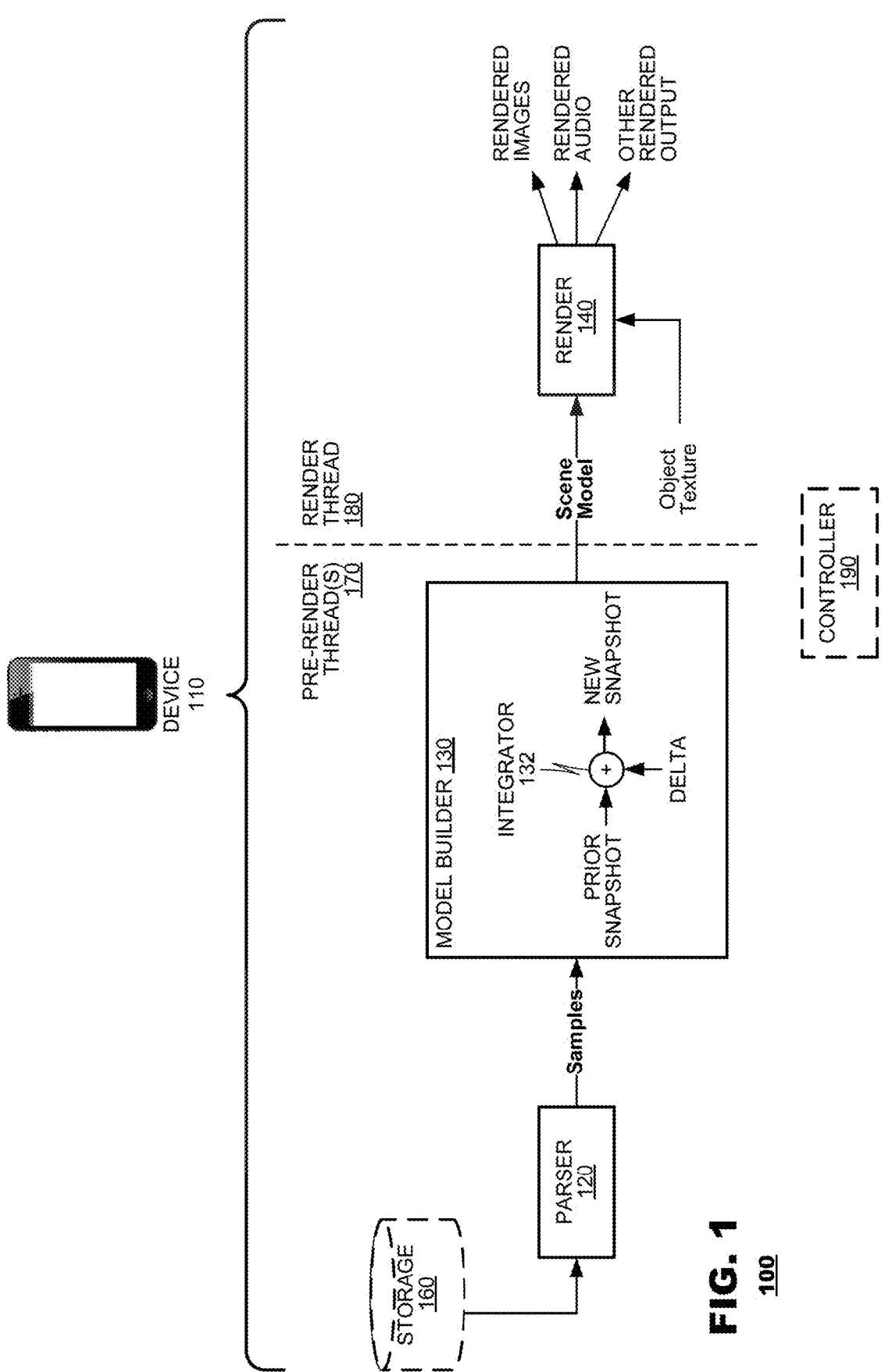
FIG. 1 is a block diagram of a media processing system according to an aspect of the present disclosure.

In some cases, different tracks for a media item may contain media samples for different content types, such as audio, images, and/or scene descriptions. For example, a media file may include a first track that represents video content of a scene and a separate track that develops an object model of the same scene. A player device may play content of the scene from either (or both) tracks. A file format may include design features that enable efficient storage and streaming, and may also enable efficient processing of time-based media, includes efficient seeking and rending of the media.

Aspects of the present disclosure provide improved media data formats and improved techniques for processing media data. In an aspect of the disclosure, the improved format may represent a media asset and include a sequence of entries for representing a model of objects in the media asset, where each entry describes the model over an interval of media time. The entries may include model snapshots, each providing a self-contained definition of the model over its respective interval, and model deltas, each providing a definition of the object model over its respective interval expressed differentially with reference to a model defined in a prior entry. The improved data format may include a "convenience" entry having a model delta and model snapshot that both describe a common interval of time.

The media formats presented in the instant disclosure can lead to processing advantages when media entries are processed by a consuming device. Model deltas often incur lower resource consumption by consuming devices process as compared to model snapshots, which can lead to resource conservation when consuming devices process entries of a media item from a large number of samples in succession (e.g., across multiple snapshots). Model snapshots, however, support discontinuous playback flow across a media items, which may be necessary in "trick play" modes that require fast progressions across a media timeline, discontinuous progressions across a media timeline, and the like. Moreover, model snapshots and model deltas can be processed in batch processing, outside of the processing systems that apply rendering data to object models, which as discussed below conserve processing resources even further.

In an aspect, a first model snapshot for a first interval may identify objects in a scene, and a first model delta for a second interval may identify changes to the objects in the scene, new objects added to the scene, and/or removal of objects in the scene. In another aspect, a first model delta for a first interval may be defined with reference to a prior entry of a second model delta for a second interval. In a further aspect, the scene is a three-dimensional (3D) scene, the objects are 3D objects, and the state is a 3D state. In aspects, an interval of media time be identified by a timestamp.

In an aspect of the disclosure, improved processing techniques include seeking within a media stream from a current media time to a desired media time and identifying a first media sample corresponding to the desired media time. When the first media sample contains a model delta at the desired media time and the model delta refers to a second media sample corresponding to a second media time, creating a temporary snapshot at the desired media time by merging the second media sample with the model delta at the desired media time, and rendering the temporary snapshot. When the first media sample contains a snapshot at the desired media time, rendering the snapshot from the first media sample. Efficiencies may be achieved by the merging of the second media sample with a model delta from a different media sample. A rendering of the merged media samples may be more efficient than a rendering processes that must consider both media samples in order to render the desired media time. Furthermore, when merging and rendering are performed in different threads, reliability and efficiency of the rendering thread may be improved. In many cases, a rendering thread operates in real-time or near-real-time, and may have an increased need for reliable or predictable processing latencies as compared to pre-rendering operations, such as model building and merging samples.

In an aspect, the second media sample may include a snapshot at the second media time, and the creating of the temporary snapshot may include merging the snapshot at the second media time with the model delta at the desired media time. In another aspect, the second media sample may include a model delta at the second media time that refers to a third media sample corresponding to a third media time, the creating of the temporary snapshot may include merging the model delta at the second media time with the model delta at the desired media time. In a further aspect, the creation of the temporary snapshot may occur on a computing device within the context of a first computer thread, and the rendering of the snapshots may occur on the computing device within the context of a second computer thread, separate from the first computer thread. In an additional aspect, the media stream may include a sequence of entries for representing a model of objects in a media asset, each entry describing the model over an interval of media time, and the second media sample may be a "convivence" media sample including both a model snapshot at the desired media time providing a self-contained definition of the model over its respective interval including the desired media time, and including a model deltas providing a definition of the model over the respective interval with reference to a model defined in a second media sample for a corresponding second media time.

Techniques described herein may provide a variety of improved efficiencies. For example, in a first aspect, the use of delta samples allows for more efficient encoding of media items as compared to use of snapshots only. In a second aspect, the various uses of snapshots and delta samples described herein provide encoded data access efficiencies, such as by reducing the number of accesses to encoded data or a reduction in the amount of encoded data needed for a seek operation within an encoded media item. In a third aspect, a division between render-time and pre-rendering operations may improve render-time performance, such as by reducing a rendering latency, and furthermore, encoded format may facility such render-time performance improvements.

FIG. 1 is a block diagram of a media processing system 100 according to an aspect of the present disclosure. Media processing system 100 may be implemented, for example, on a computing device such as device 110. Media processing system 100 may include a parser 120, model builder 130 with an integrator 132, and a render component 140.

In operation, a stream of a media item may include a series of entries of the media item, each entry corresponding to a sample of a scene described by the media item over the sample's corresponding range of time. Parser 120 may identify samples of an encoded media item for use by model builder 130. Samples of the media item may include "snapshots" and/or "deltas" of a scene represented in the media item, where a snapshot may provide a self-contained definition of the model over the sample's respective time interval, and a delta may provide a definition of the model over its respective interval expressed differentially with reference to a model defined in a different sample. Thus, interpretation of a delta may be contingent on the other different sample, while interpretation of a snapshot may not be contingent on any other samples. Integrator 132 may combine a delta having a current sample's time range (or a current time range) with a snapshot having a different time range to create a new snapshot for the current time range. An object model of a scene may be provided to render component 140 for each temporal instance of the scene to be rendered. In an aspect, render component 140 may integrate the object model with other content element(s) provided to it and render the resultant scene description on a playback device, for example, rendered video, rendered audio, and/or other rendered media types (such as closed captioning, hepatic feedback, etc.)

In an aspect, media samples, snapshots, and deltas may describe models of objects in a scene to be rendered. For example, a live scene of real objects may have been captured by a camera and mic and may be encoded in the media item as a samples describing a model of the objects in the live scene, a scene of synthetic objects may be model encoded as samples of a model, such as a two-dimensional (2D) or three-dimensional (3D) model, of the synthetic objects, and synthetic and live objects may be combined in a single media item.

In the case of a 2D or 3D model of a scene, elements of the model may include a scene structure, scene assets, and scene anchors. Scene structure may include, for example, a tree of objects or other entities in the scene, and components assigned to those entries. Scene assets may include 2D or 3D geometry, textures, animations, and audio files, which may be associated with objects in the scene.

As explained above, a snapshot may provide a self-contained definition of the model over its respective interval. For example, a snapshot of a 3D scene model may be used to construct the state of all models of all objects in the scene at that moment in time from scratch without reference to other samples in the sequence of entries in the media item, and the constructed state may include scene structure, scene assets, geometry, textures, audio files, etc.

As also explained above, a delta may provide a definition of the object model differentially with reference to a previously defined model. For example, a delta of a 3D scene model my describe changes to the scene structure, scene assets, geometry, textures, audio files, etc. described in a previous media sample. The changes to the model described by a delta may include, for example, addition of object(s), removal of object(s), or changes to object(s). Deltas may also describe addition, removal, or changes to attributes, such as location, size, transparency, associated sound volume, etc., of preexisting objects in the scene. In an aspect, a delta's reference media sample, from which change is differentially described, may occur before or after the delta's time interval.

In an example of delta integration, model builder 130 may construct a model of a scene from a snapshot of the scene corresponding to a first time, and provide a representation of the object model to render component 140 for rendering. Then while render component 140 is rendering the scene at the first time, model builder 130 may integrate the model of the scene at the first time with a delta of the scene at a second time. When the delta includes a new object that did not exist in the scene model at the first time, the new object may be added to the updated scene model. When the delta removes an object from the scene, the object may be deleted from the updated scene model. When the delta includes changes to an attribute of an object (e.g., location or transparency of the object), model builder 130 may alter that object's attribute accordingly in the updated scene model. Render elements from the updated scene model may then be provided to render component 140 in order to render the scene at the second time.

In an aspect, model builder 130 and render component 140 may operate separately. For a first example, model builder 130 and render component 140 may operate in parallel within the context of separate respective process threads on a common processing device, such as one or more optional pre-render thread(s) 170 and one or more optional render thread(s) 180. In another example, model builder 130 and render component 140 may operate in parallel on separate processors, on separate cores of a processor, or on custom circuitry (such as a graphic processing unit (GPU) and audio circuitry).

Optionally, in another aspect, system 100 may include storage 160 and controller 190. Storage 160 may store the media item in an encoded serialized media data format including a series of entries of media samples. Storage 160 may be part of device 110. In another example, storage 160 may be part of a network-connected device separate from system 100, and parser may retrieve portions of the media item from the separate device via a network. In yet another example the media item processed by system 100 may be created in real-time, such as by a live capture device, and the media item may not exist as a complete data file on any storage device. Controller 190 may be a central processing unit (CPU) or other processor, and may control operations of parser 120, model builder 130, and render component 140. In an aspect, an operating system running on controller 190 may manage threads 170 and 180.

Figure 2:
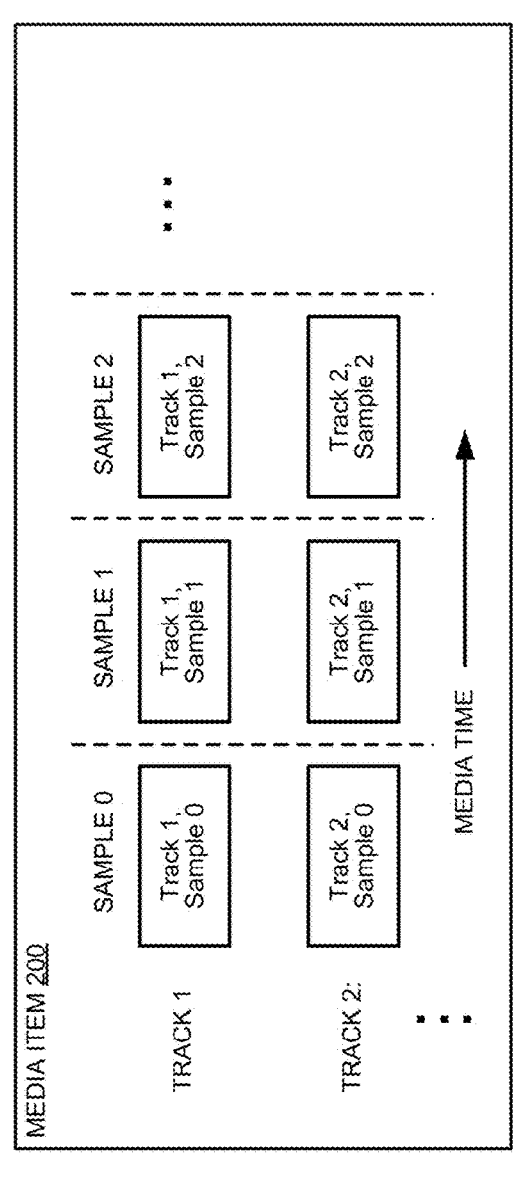
FIG. 2 depicts a media data format with multiple tracks according to an aspect of the present disclosure.

FIG. 2 depicts a media data format with multiple tracks according to an aspect of the present disclosure. Media item 200 may a format of a media item input to parser 120 of FIG. 1, and may be stored on optional storage 160. Media item 200 may include a series of entries of samples 0, 1, 2, . . . , each with a corresponding to media time (for example by including a corresponding media time stamp or indication of a corresponding range of media time for each sample). Samples in media item 200 may be organized in into tracks 1, 2, . . . . For example, as depicted in FIG. 2, media item 200 includes a sample 0 for track 1 and a sample 0 for track 2. Different tracks may correspond, for example, to different media types (e.g. audio, video, or a 2D or 3D synthetic media type), and/or different of versions the same media type (e.g. different language versions of an audio track). Media item 200 may include synchronization information such as timestamps for rendering multiple tracks in sync (e.g., rendering samples from multiple tracks that corresponding to the same media time). In an aspect, the time interval described by sample 0 may be identified by a timestamp of 0, and sample 1 may be identified by a timestamp of 1, etc.

Figure 3:
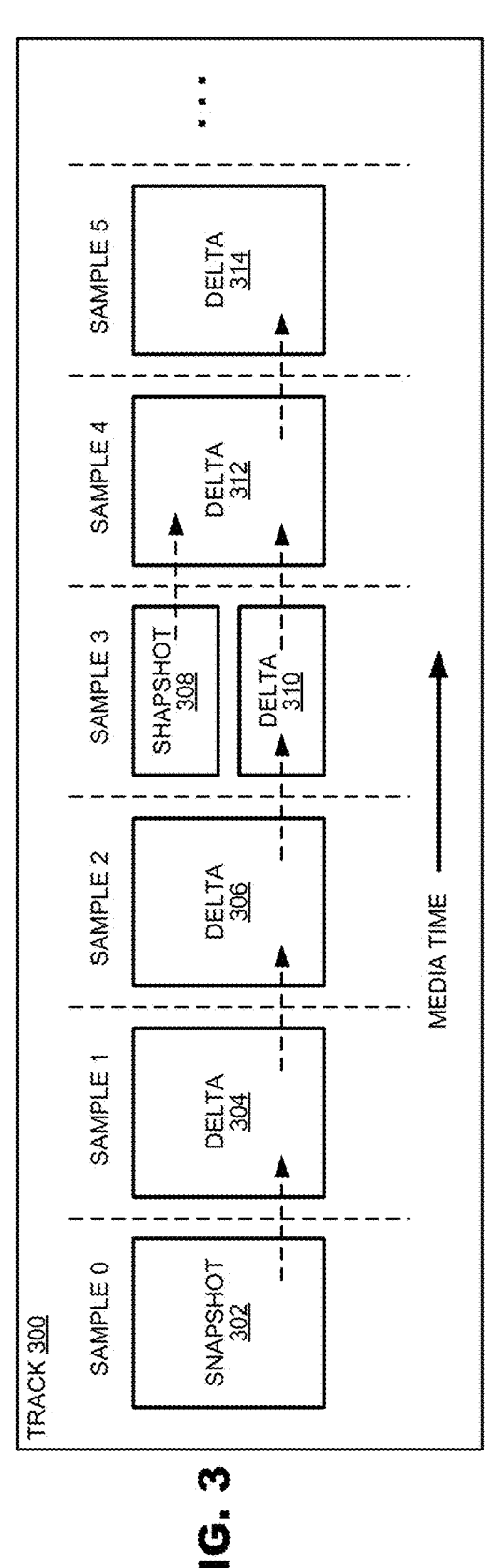
FIG. 3 depicts a format for a track in a media file according to an aspect of the present disclosure.

FIG. 3 depicts a format for a track 300 in a media file according to an aspect of the present disclosure. Track 300 may be a track for a scene in media item 200 of FIG. 2. Track 300 includes a series of media sample entries, each of which includes a snapshot, or a delta, or both. For example, sample 0 includes snapshot 302 corresponding to time 0, sample 2 includes a delta 306 corresponding to time 2, and sample 3 includes both a snapshot 308 and delta 310, and both snapshot 308 and delta 310 correspond to the same time 3. As explained above, snapshots, such as snapshot 302 and snapshot 308, describe a scene without respect or reference to other samples, while deltas, such as delta 306 and delta 310, may only describe a model by way of reference to another sample. In FIG. 3, delta's reference to another sample is depicted with a dashed arrow. For example, delta 304 at time 1 may describe a scene with respect to snapshot 302 at time 0, and delta 314 at time 5 describes a scene with respect to delta 312 at time 4.

Sample 3 in FIG. 3 includes snapshot 308 and delta 310, both of which describe a scene at time 3. This combination of a snapshot and delta corresponding to the same media time is called a "convenience" sample herein. The convenience sample 3 provides a rendering system with options for reconstructing the scene at times 3 and 4. Options for time 3 are considered first. Snapshot 308 describes the scene independently, and hence a media processing system, such as system 100 of FIG. 1, may reconstruct the scene of track 300 based on snapshot 208 without reference to any other samples. Alternately, delta 310 describes the scene at time 3 with respect to sample 2, so a rendering system that already has developed a state of the scene at time 2 may reconstruct the scene at time 3 by integrating delta 310 to the scene state at time 2. In an aspect, a delta sample may be more compact than a snapshot sample. In another aspect, processing requirements for constructing a scene by integrating a delta with a prior know scene may be lower than constructing a scene from scratch with a snapshot.

Convenience sample 3 also allows options for rendering time 4. Sample 4 includes delta 312 referring to the scene at time 3, and the scene at time 3 is described separately in snapshot 308 and delta 310. This allows a rendering system to integrate delta 310 in a state of the scene at time 3 created from snapshot 308 or from delta 310.

When a rendering system renders the samples of track 300 sequentially from sample 0 to sample 5, the rendering system may start by constructing the scene at time 0 with snapshot 302, and then update the scene for times 1, 2, 3, 4, and 5 by sequentially integrating deltas 304, 306, 310, 312, and 314. However, when a rendering system starts rendering at sample 3 or later, for example following a seek within track 300 to media time 4, then the rendering system may start by constructing the scene from snapshot 208 in sample 3 instead of starting with snapshot 302 in sample 0. By starting with the snapshot 308 convenience sample 3, a rendering system may avoid the complexity of integrating deltas from samples 1, 2, and 3.

Figure 4:
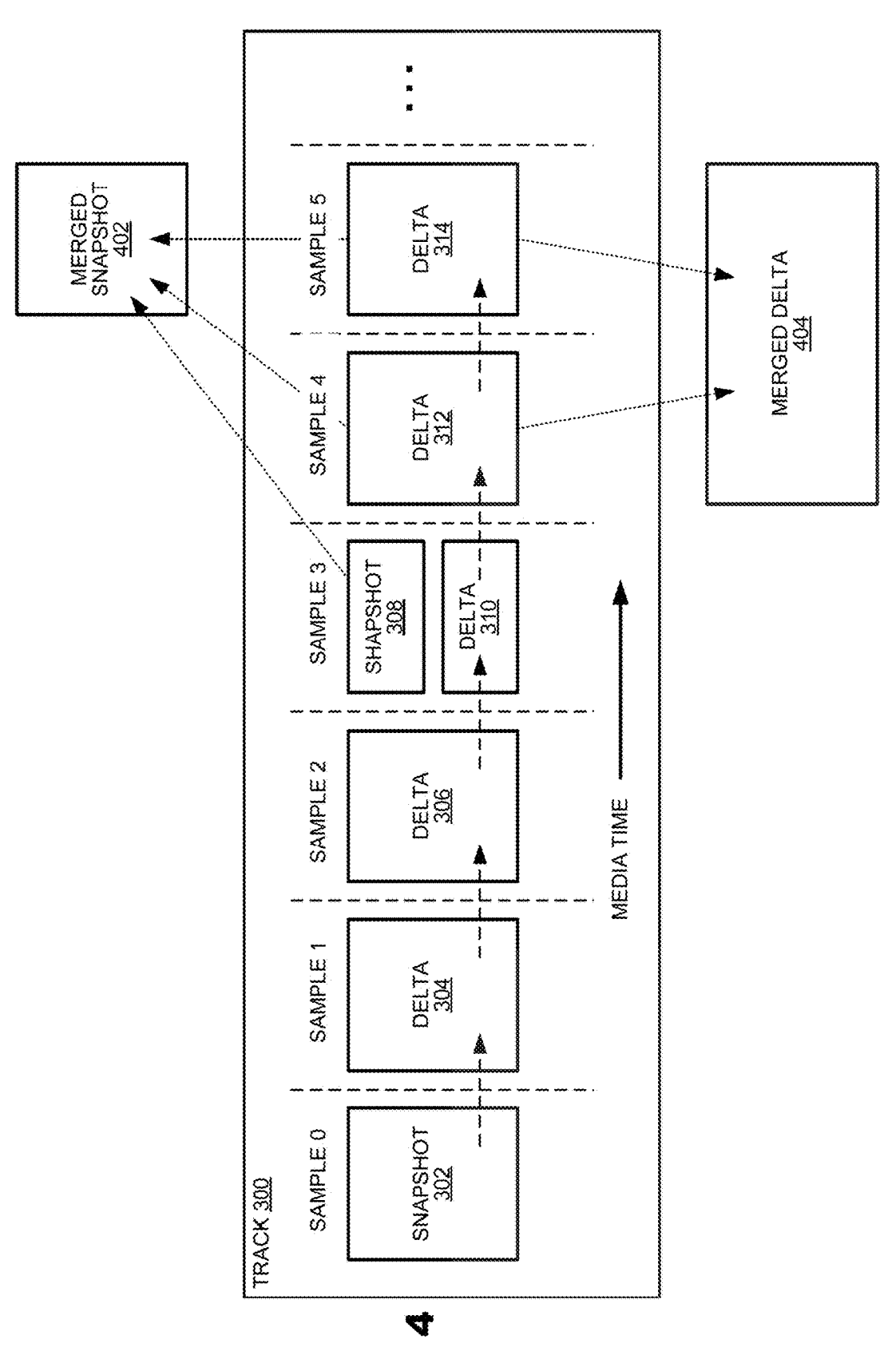
FIG. 4 depicts example merged media samples according to an aspect of the present disclosure.

FIG. 4 depicts example merged media samples according to an aspect of the present disclosure. Merged media samples 402 and 404 may be created from track 300 of FIG. 3. In a first example of a merged media sample, a merged snapshot 402 may be created for media time 5 by integrating snapshot 308 with deltas 312 and 314. Then the scene of track 300 can be rendered at time 5 from merged snapshot 402 without further reference to any other samples. In a second example, merged delta 404 describing media time 5 may be created by combining delta 312 and delta 314. Then the scene can be rendered at time 5 with reference to the scene at time 3 as described by either delta 310 or snapshot 308. Construction of merged samples after a seek may enable rendering efficiency, for example when rendering is performed separately from the merging (such as in parallel in separate threads). For example, following a seek to sample 5, construction of a merged snapshot 492 or a merged delta 404 in a separate pre-render thread context may enable lower latencies and/or higher reliability in rendering the scene at time 5.

Media samples may be merged by combining changes described in one or more model deltas. If an object is newly added in a first example delta, the new object may be combined with a prior description of the model. When the first example data is merged with a prior snapshot, a new snapshot may be created that includes the prior snapshot along with the additional new object added by the first example delta. When the first example delta is merged with another delta, a new delta may be created that includes the added new object along with the changes from the merged delta. In a second example delta, a prior object may be deleted. When the second example delta is merged with a prior description of the model, the prior object may simply be removed from the prior description. A third example delta may include a change to an existing object, such as a change to an attribute of the object. When the third example delta is merged with a prior description of the model, the result may be a snapshot or delta indicating the changed attribute of the object. In an aspect, a delta may include multiple changes. For example, a delta my include an addition of a new first object, a removal of a pre-existing second object, as well as a change in an attribute of a pre-existing third object.

In an aspect, media samples may be iteratively merged. For example, a snapshot and a delta (such as snapshot 308 and delta 312) may be merged into a new temporary snapshot, which can then be merged with another delta (such delta 314) to produce a final merged snapshot (such as merged snapshot 402). Similarly, a sequence of deltas may be iteratively merged to produce a new delta.

Figure 5:
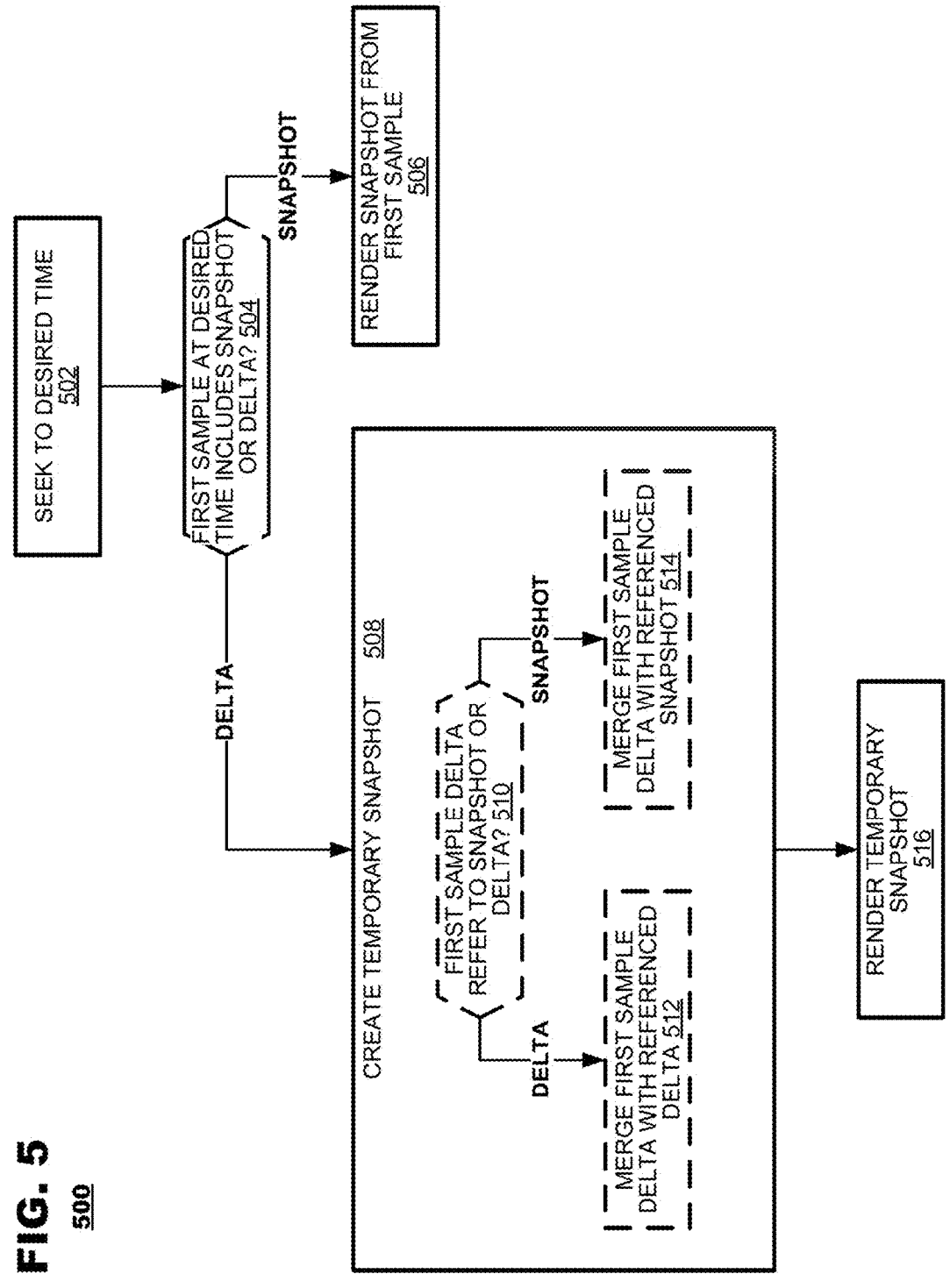
FIG. 5 illustrates a method including creating a temporary snapshot according to an aspect of the present disclosure.

FIG. 5 illustrates a method 500 including creating a temporary snapshot according to an aspect of the present disclosure. Method 500 includes seeking a media item to a desired media time (box 502) to identify a first media sample at the desired media time. When the identified first media sample includes a snapshot (box 504), the snapshot of the first media sample may be rendered (box 506). When the identified media sample includes a delta (box 504), then a temporary snapshot is created (box 508), and the temporary snapshot may be rendered at the desired media time (box 516).

Using FIG. 4 as an example of method 500, the track 300 may be seeked to sample 5 at desired media time 5 (box 502), and because sample 5 includes delta 314, a merged sample, a temporary snapshot such as merged snapshot 402 is created (box 508) and rendered (box 516).

Method 500 also includes optional operations 510, 512 and 514. When the delta in the first media sample delta refers to another delta at a different media time (box 510), the referenced delta is integrated with the first media sample's delta (box 512) to create the temporary snapshot. When the delta in the first media sample delta refers to a snapshot at a different media time (box 510), the referenced snapshot is integrated with the first media sample's delta (box 514) to create the temporary snapshot.

Figure 6:
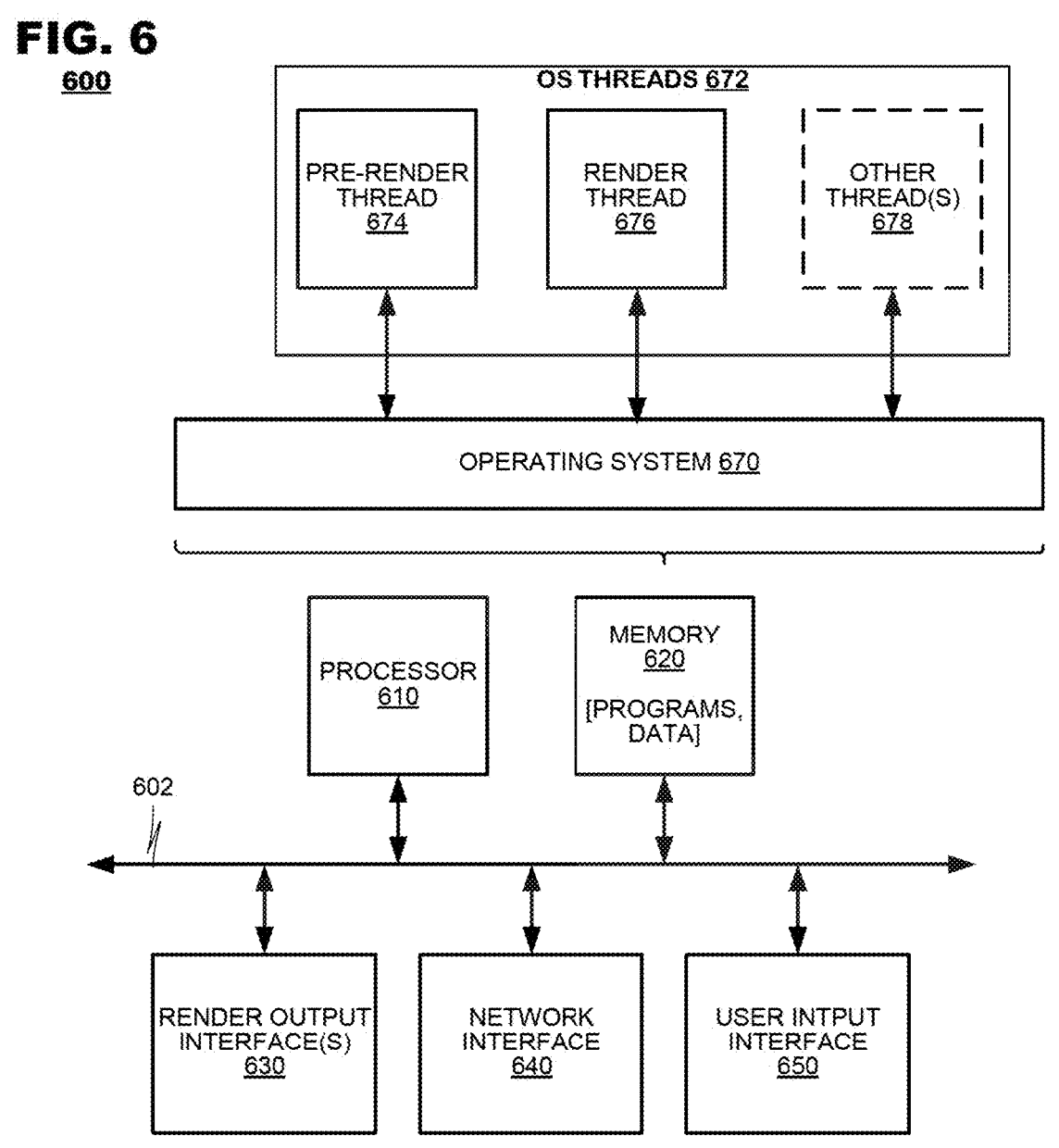

FIG. 6 illustrates a computing device according to an aspect of the present disclosure. The computing device 600 can be, and/or can be a part of, any computing device or server for generating the features and processes described above, including but not limited to a laptop computer, a smartphone, a tablet device, a wearable device such as a goggles or glasses, and the like. For example, computing device 900 may be used to implement device 110 (FIG. 1), and method 500 (FIG. 5). The computing device 600 may include various types of computer readable media and interfaces for various other types of computer readable media. The computing device 600 includes memory 620, a user input device interface 650, a rendered output device interface 630, a bus 602, one or more processing unit(s) 610, a network interface 640, and/or subsets and variations thereof.

The bus 602 collectively represents all system, peripheral, and chipset buses that communicatively connect the numerous internal devices of the computing device 600. In one or more implementations, bus 602 communicatively connects the one or more processing unit(s) 601 with memory 620. The one or more processing unit(s) 610 may retrieves instructions to execute and data to process from memory 620 in order to execute the processes of the subject disclosure. The one or more processing unit(s) 610 may be a single processor or a multi-core processor in different implementations.

Memory 620 may include one or more permanent storage and/or temporary storage device(s), such as a tangible computer readable medium, read-only-memory (ROM), read-and-write memory such as random-access-memory (RAM), hard disks and other non-volatile memory devices, optical discs, flash memory, etc. Memory 620 may contain instructions and/or data for several programs, such as operating system 670, and the processes running within a context of pre-render thread 674, render thread 676, and other separate threads contexts.

Bus 602 also connects to the input and output device interfaces 630, 650. The input device interface 650 may enable a user to communicate information and select commands to the computing device 600. Input devices used with the input device interface 650 may include, for example, alphanumeric keyboards and pointing devices (also called "cursor control devices"). The output device interface 630 may enable, for example, rendering of images and sounds generated by computing device 400. Output devices that may be used with the output device interface 408 may include, for example, printers and display devices, such as a liquid crystal display (LCD), a light emitting diode (LED)

display, an organic light emitting diode (OLED) display, a flexible display, a flat panel display, a solid-state display, a projector, a sound speaker, tactile or hepatic output, or any other device for outputting information. In an aspect, some devices such as a touchscreen, may provide both user input and user output to device 600.

Finally, as shown in FIG. 6, the bus 602 also couples the computing device 600 to one or more networks and/or to one or more network nodes through the one or more network interface(s) 640. In this manner, the computing device 600 can be a part of a network of computers (such as a LAN, a wide area network ("WAN"), or an Intranet, or a network of networks, such as the Internet. Any or all components of the computing device 600 can be used in conjunction with the subject disclosure.

The foregoing discussion has described operation of the aspects of the present disclosure in the context of a media processing system, such as system 100 depicted FIG. 1. Commonly, these components are provided as electronic devices. Video processing systems and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically include instructions stored in non-transitory physical storage media such as electronic, magnetic, and/or optically-based storage devices, where they are read by a processor and executed. Media processing systems commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Several aspects of implementations of the invention are specifically illustrated and/or described herein. However, it will be appreciated that modifications and variations of the invention are covered by the above teachings and within the purview of the appended claims without departing from the spirit and intended scope of the invention.

We claim:

1. A non-transitory computer readable medium for representing a media asset comprising:

a sequence of entries for representing a model of objects in the asset, each entry describing the model over an interval of media time, the entries comprising:

model snapshots each providing a self-contained definition of the model over its respective interval, and model deltas each providing a definition of the model over its respective interval with reference to a prior model defined in a prior entry, wherein the sequence of entries includes at least one convenience entry having a convenience model delta of the model deltas and a corresponding model snapshot of the model snapshots, and the model delta and the corresponding model snapshot describe a common interval of time.

2. The medium of claim 1, wherein a first model snapshot of the model snapshots for a first interval identifies objects in a scene, and a first model delta of the model deltas for a second interval identifies changes to the objects in the scene, new objects added to the scene, and/or removal of objects in the scene.

3. The medium of claim 1, wherein a first model delta of the model deltas for a first interval is defined with reference to another prior entry of a second model delta of the model deltas for a second interval.

4. The medium of claim 1, wherein the asset is a three-dimensional (3D) scene, the objects are 3D objects, and the model is a 3D model.

5. A method for seeking within a media stream of media samples, comprising:

seeking within the media stream from a current media time to a desired media time including identifying a first media sample corresponding to the desired media time;

when the first media sample contains a model delta at the desired media time, the model delta referring to a second media sample corresponding to a second media time:

creating a temporary snapshot at the desired media time by merging the second media sample with the model delta at the desired media time; and rendering the temporary snapshot; and when the first media sample contains a snapshot at the desired media time, rendering the snapshot from the first media sample.

6. The method of claim 5, wherein the second media sample includes a snapshot at the second media time, the creating of the temporary snapshot includes:

merging the snapshot at the second media time with the model delta at the desired media time.

7. The method of claim 5, wherein the second media sample includes a model delta at the second media time that refers to a third media sample corresponding to a third media time, the creating of the temporary snapshot includes:

merging the model delta at the second media time with the model delta at the desired media time.

8. The method of claim 7, wherein the creating the temporary snapshot occurs on a computing device within a context of a first computer thread, and the rendering of the temporary snapshots occurs on the computing device within a context of a second computer thread, separate from the first computer thread.

9. The method of claim 5, wherein the media stream includes a sequence of entries for representing a model of objects in a media asset, each entry describing the model over an interval of media time, and the second media sample is a convivence media sample including:

a model snapshot at the desired media time providing a self-contained definition of the model over its respective interval including the desired media time, and a model deltas providing a definition of the model over the respective interval with reference to a model defined in a second media sample for a corresponding second media time.

10. A method for seeking within a media stream of media samples, comprising:

rendering a current state of a scene by rendering a current media sample of the media stream corresponding to a current media time;

seeking within the media stream from the current media time to a desired media time;

identifying a sought media sample corresponding to the desired media time;

when the sought media sample contains a model delta, creating a merged model delta by merging model deltas in media samples, wherein the model deltas corresponds to media times between the current media time and the desired media time;

rendering the scene at the desired media time by applying the merged model delta to the current state.

11. A non-transitory computer readable storage including instructions that, when executed by a processor, the processor causes:

seeking within a media stream from a current media time to a desired media time including identifying a first media sample corresponding to the desired media time;

when the first media sample contains a model delta at the desired media time that refers to a second media sample corresponding to a second media time, creating a temporary snapshot at the desired media time by merging the second media sample with the model delta at the desired media time, and rendering the temporary snapshot; and when the first media sample contains a snapshot at the desired media time, rendering the snapshot from the first media sample.

12. The computer readable storage of claim 11, wherein the second media sample includes a snapshot at the second media time, and the creating of the temporary snapshot includes:

merging the snapshot at the second media time with the model delta at the desired media time.

13. The computer readable storage of claim 11, wherein the second media sample includes a model delta at the second media time that refers to a third media sample corresponding to a third media time, the creating of the temporary snapshot includes:

merging the model delta at the second media time with the model delta at the desired media time.

14. The computer readable storage of claim 11, wherein the creating the temporary snapshot occurs on a computing device within a context of a first computer thread, and the rendering of the temporary snapshots occurs on the computing device within a context of a second computer thread, separate from the first computer thread.

15. The computer readable storage of claim 11 wherein the media stream includes a sequence of entries for representing a model of objects in a media asset, each entry describing the model over an interval of media time, and the second media sample is a convivence media sample including:

a model snapshot at the desired media time providing a self-contained definition of the model over its respective interval including the desired media time, and a model deltas providing a definition of the model over the respective interval with reference to a model defined in a second media sample for a corresponding second media time.

16. A rendering device, comprising:

a processor, and a computer readable storage including instructions that, when executed by the processor, the device causes:

seeking within a media stream from a current media time to a desired media time including identifying a first media sample corresponding to the desired media time;

when the first media sample contains a model delta at the desired media time that refers to a second media sample corresponding to a second media time, creating a temporary snapshot at the desired media time by merging the second media sample with the model delta at the desired media time, and rendering the temporary snapshot; and when the first media sample contains a snapshot at the desired media time, rendering the snapshot from the first media sample.

17. The rendering device of claim 16, wherein the second media sample includes a snapshot at the second media time, the creating of the temporary snapshot includes:

merging the snapshot at the second media time with the model delta at the desired media time.

18. The rendering device of claim 16, wherein the second media sample includes a model delta at the second media time that refers to a third media sample corresponding to a third media time, the creating of the temporary snapshot includes:

merging the model delta at the second media time with the model delta at the desired media time.

19. The rendering device of claim 16, wherein the creating the temporary snapshot occurs on a computing device within a context of a first computer thread, and the rendering of the temporary snapshots occurs on the computing device within a context of a second computer thread, separate from the first computer thread.

20. The rendering device of claim 16, wherein the media stream includes a sequence of entries for representing a model of objects in a media asset, each entry describing the model over an interval of media time, and the second media sample is a convivence media sample including:

a model snapshot at the desired media time providing a self-contained definition of the model over its respective interval including the desired media time, and a model deltas providing a definition of the model over the respective interval with reference to a model defined in a second media sample for a corresponding second media time.

* * * * *